(12) United States Patent
Bry et al.

(10) Patent No.: US 10,124,877 B2
(45) Date of Patent: Nov. 13, 2018

(54) METHOD FOR MEASURING THE POSITION OF A MOBILE STRUCTURE

(71) Applicant: Airbus Operations (SAS), Toulouse (FR)

(72) Inventors: Jean-Christophe Bry, Campbon (FR); Claude Leonetti, Courcouronnes (FR); Gregoire Pebernad De Langautier, Paris (FR)

(73) Assignee: Airbus Operations SAS, Toulouse (FR)

( * ) Notice: Subject to any disclaimer, the term of this patent is extended or adjusted under 35 U.S.C. 154(b) by 260 days.

(21) Appl. No.: 15/159,240

(22) Filed: May 19, 2016

(65) Prior Publication Data
US 2016/0340016 A1 Nov. 24, 2016

(30) Foreign Application Priority Data
May 20, 2015 (FR) ...................................... 15 54526

(51) Int. Cl.
*G06K 9/00* (2006.01)
*B64C 1/06* (2006.01)
(Continued)

(52) U.S. Cl.
CPC .................. *B64C 1/069* (2013.01); *B64F 5/10* (2017.01); *G01B 11/14* (2013.01); *G01B 11/24* (2013.01);
(Continued)

(58) Field of Classification Search
CPC ........... B64C 1/069; B64F 5/10; G01B 11/14; G01B 11/24; G01C 11/02; G01C 11/025;
(Continued)

(56) References Cited

U.S. PATENT DOCUMENTS 7,454,265 B2 * 11/2008 Marsh .................. G01B 11/002
700/159
2007/0153297 A1 7/2007 Lau
(Continued)

OTHER PUBLICATIONS

Liu et al,. "Automated rivet detection in the EOL image for aircraft lap joints inspection", Sep. 2006, Elsevier, NDT & E International, vol. 39, iss. 6, pp. 441-448.*
(Continued)

*Primary Examiner* — Vincent Rudolph
*Assistant Examiner* — Timothy Choi
(74) *Attorney, Agent, or Firm* — Greer, Burns & Crain, Ltd.

(57) ABSTRACT

A method for measuring the position of a mobile structure in a set of reference axes, the structure comprising a plurality of intrinsic recurrent structural elements, comprising the following steps undertaken by a processor. Acquiring simultaneous images of the structure from a plurality of optical devices, each recurrent element being in a field of view of at least three separate optical devices. Extracting the recurrent elements from each image and determining their position in the image. Computing at least one indicator for each recurrent element detected in each image. Identifying each recurrent element by associating a unique identifier with each element, the identifier being related to the position of each optical device in the set of reference axes, and to at least one indicator associated with each element in each image. Determining the position, by implementing a photogrammetric algorithm, of each recurrent element in the set of reference axes.

16 Claims, 4 Drawing Sheets

(51) Int. Cl.

| | |
|---|---|
| G01B 11/14 | (2006.01) |
| G01B 11/24 | (2006.01) |
| G06K 9/46 | (2006.01) |
| G06K 9/66 | (2006.01) |
| G06T 7/00 | (2017.01) |
| H04N 5/247 | (2006.01) |
| G01C 11/06 | (2006.01) |
| B64F 5/10 | (2017.01) |

(52) U.S. Cl.
CPC ............ *G01C 11/06* (2013.01); *G06K 9/4604* (2013.01); *G06K 9/66* (2013.01); *G06T 7/0004* (2013.01); *H04N 5/247* (2013.01); *G06T 2207/30164* (2013.01)

(58) Field of Classification Search
CPC ........ G01C 11/06; G06K 9/4604; G06K 9/66; G06T 7/0004; G06T 7/0008; G06T 17/20; G06T 2207/30164; H04N 5/247
See application file for complete search history.

(56) References Cited

U.S. PATENT DOCUMENTS

| | | | | |
|---|---|---|---|---|
| 2008/0123112 | A1* | 5/2008 | Marsh | G01C 11/02 356/625 |
| 2011/0200245 | A1* | 8/2011 | Crothers | G05B 19/4183 382/141 |
| 2012/0043009 | A1* | 2/2012 | Niermann | B05C 11/1021 156/64 |
| 2012/0133739 | A1 | 5/2012 | Morimitsu | |
| 2012/0257017 | A1 | 10/2012 | Pettersson et al. | |
| 2013/0229511 | A1* | 9/2013 | Oostendorp | H04N 7/181 348/92 |
| 2014/0105457 | A1 | 4/2014 | Metzler et al. | |
| 2017/0355472 | A1* | 12/2017 | Migne | B64F 5/10 |

OTHER PUBLICATIONS

Shan et al., "Vehicle Identification between Non-Overlapping Cameras without Direct Feature Matching", Oct. 2005, IEEE, 10th Int. Conf. on Computer Vision 2005, pp. 1-8.*

Zhu et al., "Tracking of Object with SVM Regression", Dec. 2001, IEEE, Proceedings of the 2001 IEEE Computer Society Conf. on COmputer Vision and Pattern Recognition, vol. 2, pp. 240-245.*

Ruisz et al., "Quality evaluation in resistance spot welding by analyzing the weld fingerprint on metal bands by computer vision", Jul. 2007, Springer, Int. Journal of Advanced Manufacturing Technology, vol. 33, iss. 9-10, pp. 952-960.*

"Hough transform", Nov. 30, 2014, Wikipedia.org, <https://web.archive.org/web/20141130085620/https://en.wikipedia.org/wiki/Hough_transform#Circle_detection_process>.*

French Search Report, dated Mar. 10, 2016, priority document.

* cited by examiner

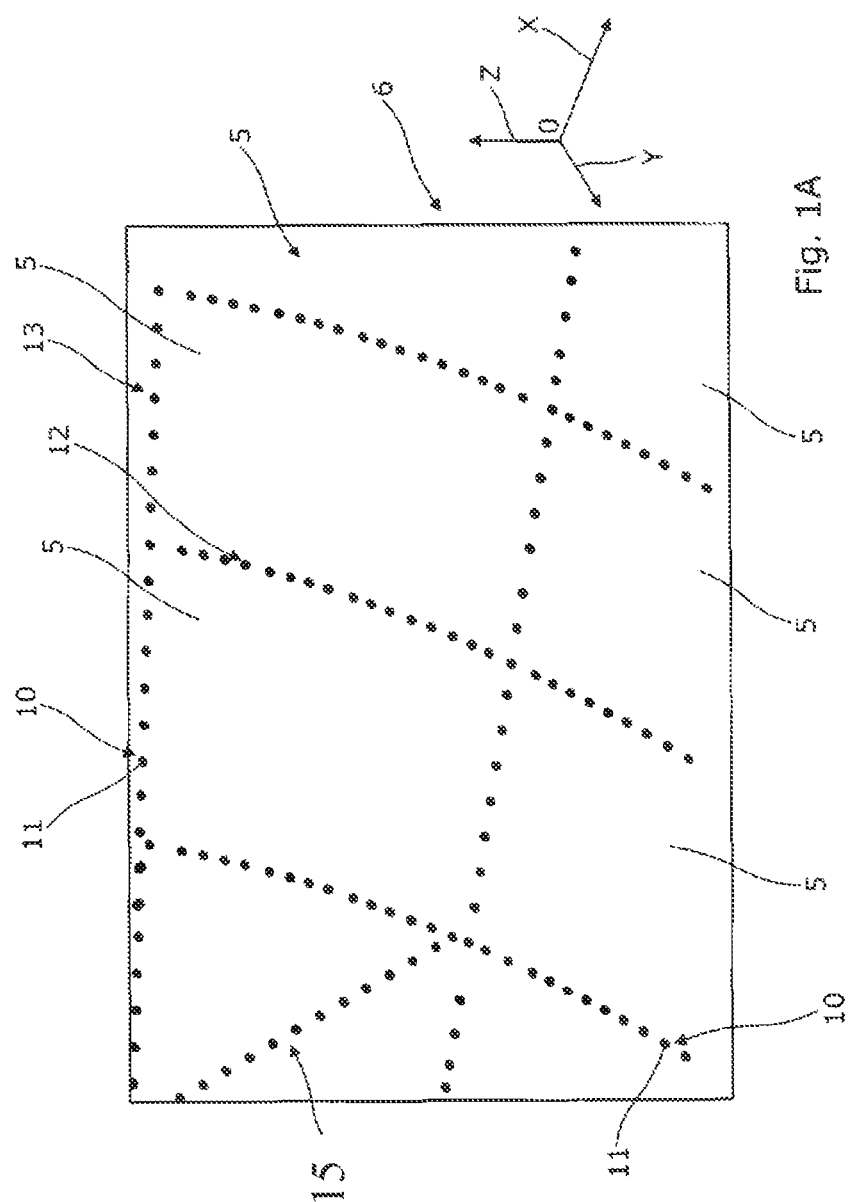

METHOD FOR MEASURING THE POSITION OF A MOBILE STRUCTURE

CROSS-REFERENCES TO RELATED APPLICATIONS

This application claims the benefit of the French patent application No. 1554526 filed on May 20, 2015, the entire disclosures of which are incorporated herein by way of reference.

BACKGROUND OF THE INVENTION

The present invention relates to a method making it possible to measure the position of a mobile structure, in particular, a structure of an aircraft fuselage.

An aircraft fuselage is, in a known way, constituted by the assembly of a plurality of structures such as the nose section, the rear section or various cylindrical sections.

The step of assembling two structures comprises positioning the structures on supports and bringing a structure mounted on a mobile support towards another structure mounted on a fixed support until the two structures are joined. The structures are then definitively fixed to each other, for example by riveting.

During its displacement, the position of the mobile structure is constantly measured in order to ensure the correct progress of the assembly step.

A photogrammetric method is used to carry out these measurements. Such a method makes it possible to construct a cloud of points in three dimensions of the mobile structure by acquiring, via several cameras, images taken at different angles, of a plurality of targets distributed over the whole of the structure and by using the parallax obtained between the different images acquired. The cloud of points makes it possible to give the respective position of the structure in a given set of reference axes. Each target, such as described notably in the document US 20070153297, comprises an optical code unique to the target. The target is reflective when it is illuminated by a laser projector so that it can be detected by the cameras.

The use of such targets for measuring the position of a structure slows down production rates because operators have to install the plurality of targets (for example of the order of 200 of them for a nose structure) solely for the measurements and then they have to remove them once the measurements have been taken.

SUMMARY OF THE INVENTION

There is, therefore, a need for a method for measuring a position of a mobile structure which is faster while being precise. The invention relates to a method for measuring the position of a mobile structure in a set of reference axes, the structure comprising a plurality of recurrent elements intrinsic to the structure, the method comprising the following successive steps:

A) acquisition, by an electrical processor, of images of the structure taken simultaneously by a plurality of optical devices, each recurrent element of the structure being in the field of view of at least three separate optical devices;

B) extraction from each of the images, by the processor, of the recurrent elements and determination, by the processor, of the position of said recurrent elements in the image;

C) computation, by the processor, of at least one indicator for each one of the recurrent elements detected in each image;

D) identification, by the processor, of each of the recurrent elements by associating a unique identifier with each of said elements, the identifier being related to the position of each of the optical devices in the set of reference axes, and to at least one indicator associated with each of said elements in each image; and E) determination of the position, by the processor implementing a photogrammetric algorithm, of each recurrent element in the set of reference axes.

One of the advantages of the present invention is that the use, as targets, of recurrent elements intrinsic to a structure, makes it possible to determine the position of said structure in a given set of reference axes without necessitating the temporary placing of targets. A photogrammetric measuring method can therefore be used without having to carry out specific preliminary preparation of the structure.

BRIEF DESCRIPTION OF THE DRAWINGS

The features of the invention mentioned below, as well as others, will become more clearly apparent on reading the following description of exemplary embodiments, said description being given with reference to the appended drawings, in which:

FIG. 1A is an enlarged view of the skin of the structure shown in FIG. 1 illustrating the configuration of the rivets on a part of said skin;

DETAILED DESCRIPTION OF THE PREFERRED EMBODIMENTS

Figure 1:
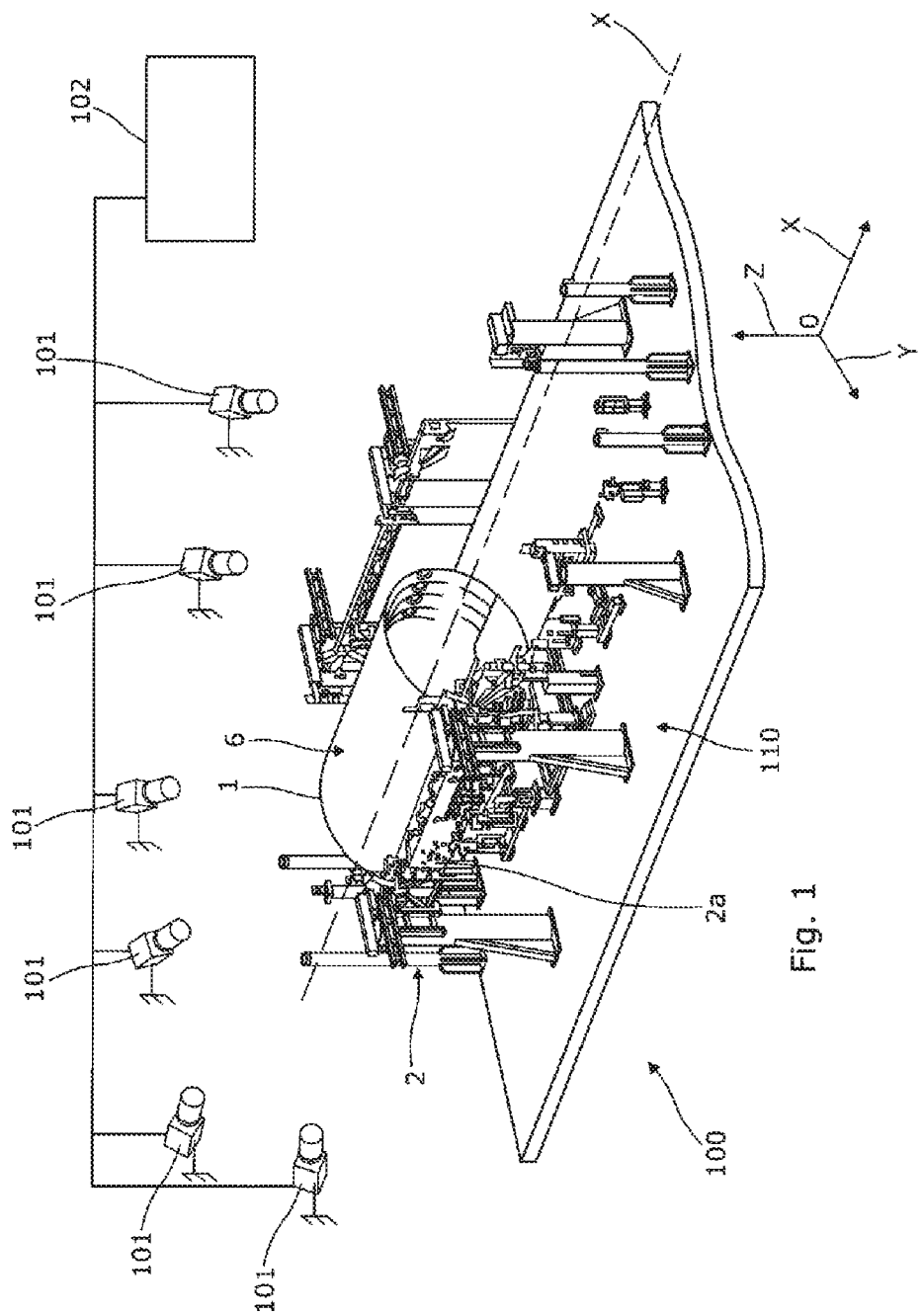
FIG. 1 is a view of the system for determining the position of a mobile structure installed in an assembly hall according to one embodiment of the invention where the structure comprises a skin attached by rivets.

With reference to FIGS. 1 and 1A, a system for measuring 100 the position of a structure is disposed so that it measures the position of a first structure 1 placed on a support 2. The first structure 1 is mobile along a horizontal axis of translation X. For this purpose, the first structure is fixed to the support via slides 2a allowing the displacement in translation of the first structure 1 with respect to the support 2.

The first structure 1 is, for example, a section of fuselage and is formed by structural elements of the frames and stringers type (not shown in the figures) forming a skeleton of the structure and upon which are fixed panels 5, for example of metal or composite material, forming the skin 6 of the structure. The panels 5 are fixed to the skeleton by rivets 10. The rivets 10 are, in a known way, disposed in the form of vertical lines 12 (along the Z axis), horizontal lines 13 (along the X axis) or intersecting diagonal lines 15, where the distance between the rivets can be variable. In a known way, the heads 11 of rivets are visible and can be distinguished from the skin 6.

According to the invention, and as will be described below, the rivets 10, as recurrent and intrinsic elements of the skin 6 of the first structure 1, are used as targets by the measuring system 100 for measuring, by photogrammetry, the position of the first structure 1 with respect to the second structure 3. The term "intrinsic elements" refers to inseparable constituent elements of the first structure 1.

The measuring system 100 comprises a plurality of optical devices 101, of the camera type, and an electrical processor 102 of the central processing unit type for the processing of the electrical signals coming from the optical devices 101 to which the processor is connected.

The number of optical devices 101 is adapted to take images of the whole of the skin 6 of the first structure 1 in such a way that each rivet 10 of said structure is in the field of view of at least three optical devices 101. In order to proceed with a measurement of the position of the first structure 1 by photogrammetry along its axis of displacement X, the optical devices 101 are moreover arranged to cover a predetermined path of the first mobile structure 1. For this purpose, the optical devices 101 are positioned at a predetermined distance, for example, on the order of 1 to 2 meters, from the skin 6 of the first structure 1.

The optical devices 101, for example of the CMOS (Complementary Metal Oxide Semiconductor) or CCD (Charge Coupled Device) camera type, have a definition of at least 15 Megapixels per camera.

The spatial positions of the shooting devices 101 in a fixed measuring set of reference axes O, X, Y, Z, called the common set of reference axes, are recorded in a memory of the processor 102. In the example shown in FIG. 1, these devices are, for example, fixed to the ceiling (not shown) of an assembly hall 110. The common set of reference axes O, X, Y, Z is in this case related to the assembly hall 110.

Figure 2:
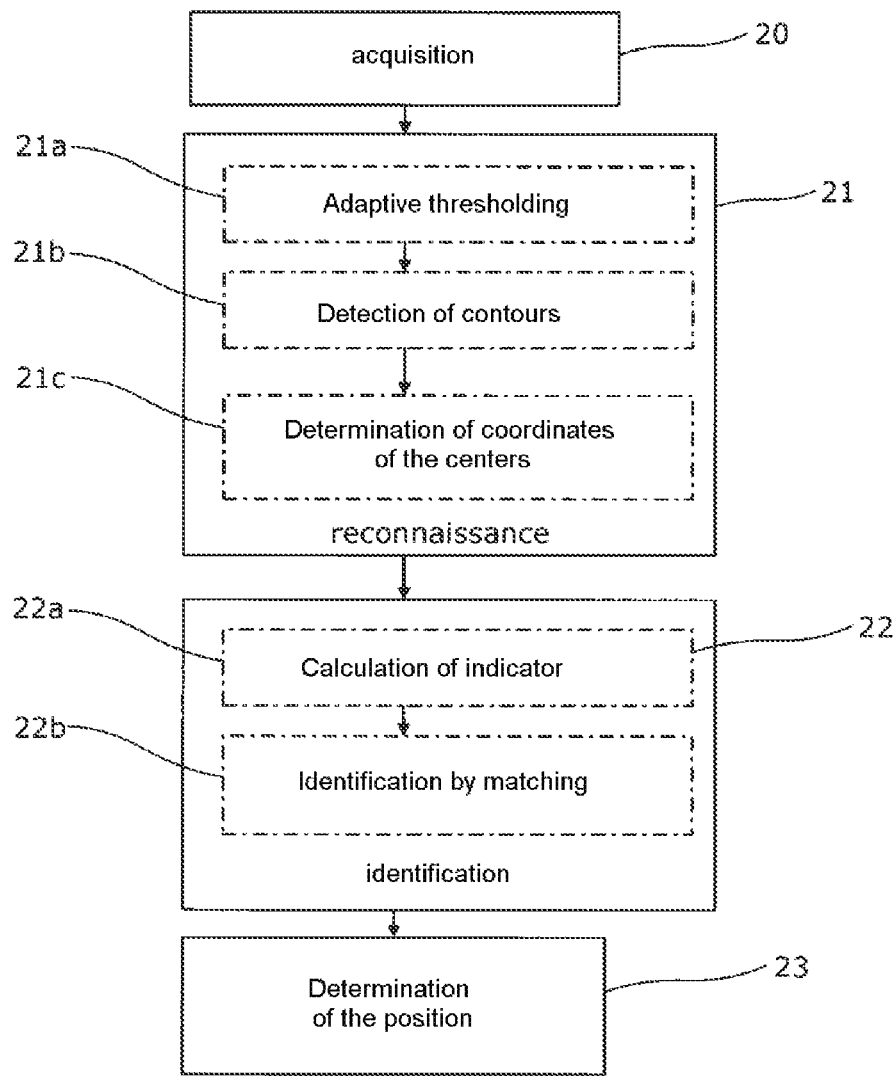
FIG. 2 is a diagram illustrating the method in four steps used by the system shown in FIG. 1 for determining the position of the structure according to one embodiment of the invention.

According to the invention, and with reference to FIG. 2, the processor 102 is configured to implement a step of acquisition 20 of images taken simultaneously by each of the optical devices 101 and to implement different image processing algorithms in order to:
- in a recognition step 21, extract the rivets 10 from the other elements of the skin 6 of the first structure 1 and determine the position of these rivets in each image,
- in an identification step 22, identify each rivet 10 detected on the different images, and
- in a step 23 of recognition of the position of each rivet, determine the respective position of each rivet identified in the common set of reference axes via a photogrammetric method.

The purpose of the image processing carried out by the processor 102 is the construction of a cloud of points, the points being the centers 11 of the detected rivets, in three dimensions, of the first structure 1 in the common set of reference axes O, X, Y, Z in order to measure the position of the latter.

In the step of recognition of the rivets 21, the processor 102 uses a recognition algorithm applied to each image, constructed in gray levels. This algorithm comprises an operation of extraction 21a, 21b of the rivets from the image and an operation of determination 21c of the coordinates of the centers of the extracted rivets.

The operation of extraction 21a, 21b of the rivets makes it possible to separate the rivets 10 from other elements present in the shot, such as the skin 6 or surface asperities of the skin. For this purpose, this operation comprises the application of successive filters which are applied to each of the images:
- An adaptive thresholding filter 21a in order to detect a characteristic shape of the rivets 10, such as, for example, the rivet heads 11. In the image constructed in gray levels, the head of a rivet being white (or respectively black), all of the detected points having a gray level that is too light (or respectively too dark) are deleted; and
- a filter for determining the contour 21b of the heads 11 applied to the previously filtered image in order to accentuate the detection of the contours of the heads in such a way as to accurately mark their extent over the image. For this purpose, a filtering technique for the detection of contours by morphological gradient is used, this technique notably comprising carrying out an expansion of the filtered image and an erosion of the filtered image and then of subtracting the eroded image from the expanded image.

Once these two filters have been applied, the image comprises no more than surfaces enclosed by contours which can have disparate shapes such that the precise coordinates of the rivets in the image, and in particular of their centers, cannot be determined. These disparate shapes are notable due to poor conditions of illumination of the heads, reflections on the heads or heads deformed by the curvature of the skin.

The operation of determination 21c of the coordinates of the extracted rivets 10 is implemented in order to accurately detect the coordinates of the extracted rivets on the image. This operation comprises searching, for each contour, for the smallest ellipse containing the contour. At the end of this operation the coordinates of the centers of the ellipses, which are similar to the centers of the rivets, and the coordinates of the ellipses are determined on each image.

In a second step, the processor implements the identification step 22. This step comprises the use of an identification algorithm which comprises, initially, of an operation of calculation 22a of at least one indicator for each ellipse of each image. The indicators are related to the configuration (vertical lines, horizontal lines, intersecting lines ...) of the rivets 10, identified as ellipses on the image, on the skin of the first structure. The indicators are, for example, taken from among the following:
- the number of ellipses in the vicinity of the ellipse being studied;
- if the ellipse is included on a horizontal ellipse line;
- if the ellipse is included on a vertical ellipse line;
- if the ellipse is included on a diagonal ellipse line;
- if the ellipse is included at the intersection of two lines;
- if the ellipse is at the center of an intersection of vertical and horizontal ellipse lines;
- if the ellipse is at the end of an ellipse line;
- the determination of the angle of attack with the centers of the closest ellipses;
- the position of the ellipse in the image.

The identification algorithm then comprises, secondly, of an operation of identification 22b of each of the ellipses by its own identifier. For this purpose, the processor 102 implements a learning algorithm of the wide margin separators (or SVM: Support Vector Machine) class by using as input data the position of each of the optical devices 101 in the common set of reference axes O, X, Y, Z and the indicator or indicators associated with each ellipse on the images. This algorithm, aimed at resettings of images, comprises matching, for a pair of images taken by two separate optical devices 101, the ellipses which have the same indicators in the first image and in the second image.

At the end of the identification step 22, each ellipse, which is located on at least three images taken by three different image taking devices, is associated with its own identifier (label). The coordinates of each center of an identified ellipse are thus determined on at least three different images.

Once the ellipses have been identified with a unique identifier, the processor implements the step of determining the position of each rivet 23. This step comprises the use of a photogrammetric algorithm 23 for determining the coordinates of each center of an ellipse identified in the common set of reference axes O, X, Y, Z. Such an algorithm, based on the triangulation principle, is known to those skilled in the art and will not therefore be described in greater detail. The purpose of step 23 is to construct a three-dimensional cloud of points of the first structure 1, the points being the centers of the ellipses (substantially having the same coordinates as the centers of the rivets). This cloud of points makes it possible to determine the respective position of each rivet 10 in the common set of reference axes, and therefore to determine the position of the first structure 1 in the common set of reference axes O, X, Y, Z.

Advantageously, the measuring system 100 according to the invention can be connected to a display device comprising a screen in order to display on the latter the position of the points in the common set of reference axes O, X, Y, Z. Operators can thus follow and directly control the displacement of the first structure.

The invention is advantageous in that the cloud of points is constructed without the use of external targets. In fact, according to the invention, it is the rivets 10 already present in the structure which are used as targets for the photogrammetry. The invention thus makes it possible to eliminate the steps of installation and removal of the targets and thus meets the abovementioned requirement for a means of measuring the position of a structure which is quick to implement.

In addition to this advantage, the measuring system 100 according to the invention can be installed permanently in an assembly hall 110 unlike the laser projector used in the measuring techniques according to the prior art. Moreover, the use of a laser necessitates special operational precautions and because of this the system according to the invention, which uses only optical devices of the camera type, is consequently simpler to implement.

Without departing from the scope of the present invention, the measuring system 100, as described, can be used for quickly and simply producing three-dimensional digital models of a structure comprising rivets. For this purpose, the positions of the rivets are recorded in a database stored in a memory of the measuring system 100.

Figure 3:
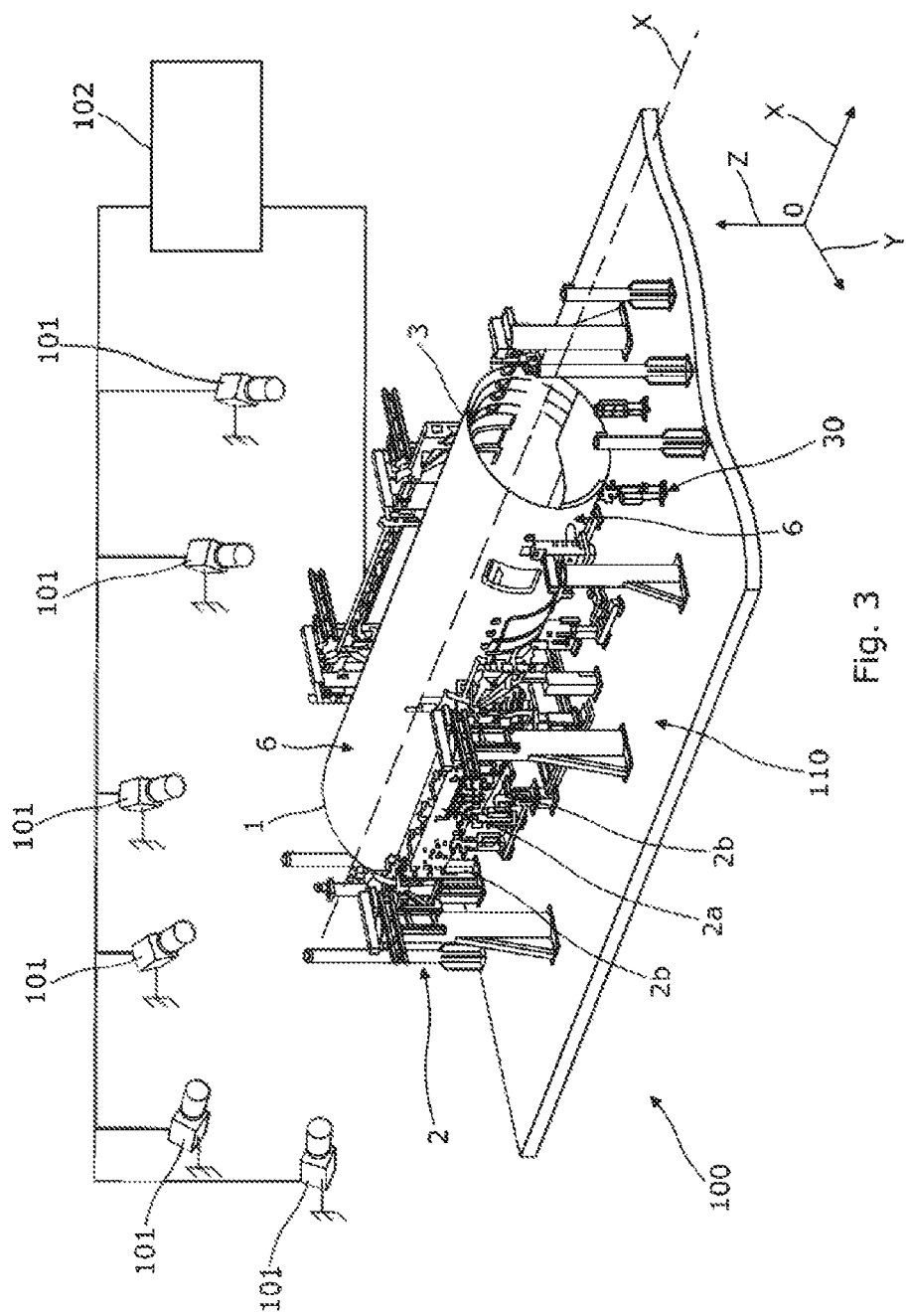
FIG. 3 is a view similar to that of FIG. 1 wherein the system for determining the position of a structure is arranged for controlling the operations for assembling the mobile structure onto a fixed structure.

With reference to FIG. 3, the measuring system 100 according to the invention is used for the automation of the assembly of the first structure 1 with a second structure 3. The second structure 3 is mounted on a fixed support 30 and is, for example, another section of fuselage formed in a way that is identical to that of the first structure.

The step of assembling the two structures 1, 3 comprises bringing the first structure 1 mounted on the mobile support 2 towards the second structure 3 with a movement of translation along the horizontal axis X until the two structures are joined. They are then definitively fixed to each other, for example by riveting.

The mobile support 2 comprises means of moving the first structure 1 in translation, such as, for example, motorized slides 2a the movement of which is controlled by a motor controlled by the processor 102. Moreover, the first structure is fixed to the mobile support via actuators 2b of the jack type, controlled by the processor 102.

The processor 102 is provided for comparing, at regular intervals, the successive positions along the horizontal axis X of the first structure 1 measured by the processor 102 according to the method described above with predefined positions recorded in a memory of the processor. In the case of deviation between the two compared positions, the processor 102 controls the actuators 2b and/or the motor of the slides 2a in order to correct the position of the first structure 1.

This embodiment makes it possible to apply automatic corrections of the alignment of the two structures 1, 3 in order to comply with the fitting and assembly tolerances of the first structure 1 with the second structure 3. This embodiment is advantageous in that the measuring of the position of the first structure does not necessitate the placing of targets on the latter. The use of this embodiment is thus simple and quick.

The invention has been described using a rivet 10 as a recurrent and intrinsic element of a structure as a target for using a photogrammetric method. Without departing from the scope of the present invention, other recurrent and intrinsic elements of a structure, like weld spots (for example automatic industrial weld spots of the MIG type), or bolts or screws, could be used instead and in place of rivets.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for measuring the position of a mobile structure in a set of reference axes, the structure comprising a plurality of recurrent elements intrinsic to the structure, the method comprising the following successive steps:
   a. acquiring, by a processor, images of the structure taken simultaneously by a plurality of optical devices, each recurrent element of the structure being in a field of view of at least three separate optical devices, wherein the at least three separate optical devices are fixed in the reference axes;
   b. extracting from each of the images, by the processor, the recurrent elements and determining, by the processor, the position of said recurrent elements in the image;
   c. computing, by the processor, at least one indicator for each one of the recurrent elements detected in each image;
   d. identifying, by the processor, each of the recurrent elements by associating a unique identifier with each of said elements, the identifier being related to a position of each of the optical devices in the set of reference axes, and to at least one indicator associated with each of said elements in each image; and
   e. determining the position, by the processor implementing a photogrammetric algorithm, of each recurrent element in the set of reference axes;
   wherein step b) comprises searching, for each of the recurrent elements, for a smallest ellipse containing the recurrent element;

wherein step d) further includes using a learning algorithm of the wide margin separators class in such a way as to match, for a first image of the images and a second image of the images taken by two of the at least three separate optical devices, ellipses which have the same indicators in the first image and in the second image.

2. The method as claimed in claim 1, wherein step b) comprises:
an adaptive thresholding of each of the images in such a way as to detect a characteristic shape of the recurrent elements; and
detecting a contour for each characteristic shape detected.

3. The method as claimed in claim 2, wherein step b) comprises searching, for each contour, for a smallest ellipse containing the contour.

4. The method as claimed in claim 1, wherein each indicator is calculated as a function of the configuration of the recurrent elements on the structure and is taken from among the following indicators:
a number of ellipses in the vicinity of an ellipse being studied;
if the ellipse is included on a horizontal ellipse line;
if the ellipse is included on a vertical ellipse line;
if the ellipse is included on a diagonal ellipse line;
if the ellipse is included at the intersection of two ellipse lines;
if the ellipse is at the center of an intersection of vertical and horizontal ellipse lines;
if the ellipse is at the end of an ellipse line;
the determination of the angle of attack with the centers of the closest ellipses;
the position of the ellipse in the image.

5. The method as claimed in claim 1, comprising an additional step of displaying, on a screen, the position of each recurrent element of the structure in the set of reference axes.

6. The method as claimed in claim 1, wherein the recurrent elements intrinsic to the structure are taken from rivets.

7. The method as claimed in claim 1, wherein the recurrent elements intrinsic to the structure are taken from bolts.

8. The method as claimed in claim 1, wherein the recurrent elements intrinsic to the structure are taken from weld spots.

9. A method for measuring the position of a mobile structure in a set of reference axes, the structure comprising a plurality of recurrent elements intrinsic to the structure, the method comprising the following successive steps:
a. acquiring, by a processor, images of the structure taken simultaneously by a plurality of optical devices, each recurrent element of the structure being in a field of view of at least three separate optical devices;
b. extracting from each of the images, by the processor, the recurrent elements and determining, by the processor, the position of said recurrent elements in the image;
c. computing, by the processor, at least one indicator for each one of the recurrent elements detected in each image;
d. identifying, by the processor, each of the recurrent elements by associating a unique identifier with each of said elements, the identifier being related to a position of each of the optical devices in the set of reference axes, and to at least one indicator associated with each of said elements in each image; and
e. determining the position, by the processor implementing a photogrammetric algorithm, of each recurrent element in the set of reference axes;
wherein step b) comprises searching, for each of the recurrent elements, for a smallest ellipse containing the recurrent element;
wherein step d) further includes using a learning algorithm of the wide margin separators class in such a way as to match, for a first image of the images and a second image of the images taken by two of the at least three separate optical devices, ellipses which have the same indicators in the first image and in the second image.

10. The method as claimed in claim 9, wherein step b) comprises:
an adaptive thresholding of each of the images in such a way as to detect a characteristic shape of the recurrent elements; and
detecting a contour for each characteristic shape detected.

11. The method as claimed in claim 10, wherein step b) comprises searching, for each contour, for a smallest ellipse containing the contour.

12. The method as claimed in claim 9, wherein each indicator is calculated as a function of the configuration of the recurrent elements on the structure and is taken from among the following indicators:
a number of ellipses in the vicinity of an ellipse being studied;
if the ellipse is included on a horizontal ellipse line;
if the ellipse is included on a vertical ellipse line;
if the ellipse is included on a diagonal ellipse line;
if the ellipse is included at the intersection of two ellipse lines;
if the ellipse is at the center of an intersection of vertical and horizontal ellipse lines;
if the ellipse is at the end of an ellipse line;
the determination of the angle of attack with the centers of the closest ellipses;
the position of the ellipse in the image.

13. The method as claimed in claim 9, comprising an additional step of displaying, on a screen, the position of each recurrent element of the structure in the set of reference axes.

14. The method as claimed in claim 9, wherein the recurrent elements intrinsic to the structure are taken from rivets.

15. The method as claimed in claim 9, wherein the recurrent elements intrinsic to the structure are taken from bolts.

16. The method as claimed in claim 9, wherein the recurrent elements intrinsic to the structure are taken from weld spots.

* * * * *